UNITED STATES PATENT OFFICE.

CARL BOSCH, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

MANUFACTURE OF UREA.

1,173,550.     Specification of Letters Patent.     Patented Feb. 29, 1916.

No Drawing.     Application filed January 23, 1915. Serial No. 4,038.

*To all whom it may concern:*

Be it known that I, CARL BOSCH, citizen of the German Empire, residing at Ludwigshafen-on-the-Rhine, Germany, have invented new and useful Improvements in the Manufacture of Urea, of which the following is a specification.

When carbon dioxid compounds of ammonia, viz. ammonium carbaminate, carbonate or bicarbonate are heated in a closed vessel, urea is formed but as is well known only a part of the materials undergo this conversion, so that a mixture of the materials used with urea and water is obtained. If this reaction mixture is worked up in the known way namely by cooling, dissolving and evaporating more or less of the urea formed is redecomposed and the unconverted ammonium salts can only be recovered in a form in which they are unable to go back into the process directly.

According to this invention the urea formed in this reaction can be worked up almost quantitatively and at the same time the ammonium salts which are not converted into urea can be easily recovered nearly free of water and therefore in a form suitable for direct further use in this process by distilling the reaction mixture at a temperature not exceeding 80 degrees C. In this way the ammonium salts are obtained directly in solid form, while an aqueous solution or paste of urea remains behind. This can be brought into a dry condition by further distillation preferably under diminished pressure.

The following example will serve to illustrate the invention, but the invention is not confined to the example: Connect the autoclave in which the conversion of ammonium carbaminate, carbonate or bicarbonate to urea has been effected by means of a valve at the bottom with a distilling vessel connected with a receiver. Then slowly run the pasty contents of the autoclave, while hot, into the distilling vessel, releasing the pressure. The distilling pot can either be kept cool at first, and afterward heated to about 75 degrees C., or it may be kept from the beginning at a temperature of 60 to 70 degrees C. Carbonic acid and ammonia distil and combine in the receiver, which is suitably cooled, to solid ammonium carbaminate or carbonate, while in the distilling pot substantially only urea and water remain behind.

To obtain the urea in a dry state the receiver is changed and then the still is further heated under diminished pressure.

Now what I claim is:—

1. In the manufacture of urea by heating carbon dioxid compounds of ammonia in a closed vessel the process of isolation of urea and of recovering the unconverted ammonium salts in a form suitable for direct further use in the process, by distilling at a temperature not exceeding 80 degrees C.

2. In the manufacture of urea by heating carbon dioxid compounds of ammonia in a closed vessel the process of isolation of urea and of recovering the unconverted ammonium salts in a form suitable for direct further use in the process, by distilling at a temperature not exceeding 80 degrees C. and then distilling further until the urea is dry.

In testimony whereof I have hereunto set my hand in the presence of two subscribing witnesses.

CARL BOSCH.

Witnesses:
ARTHUR DENONVILLE,
ANDREAS HILL.